United States Patent [19]

Patmont

[11] Patent Number: 5,775,452
[45] Date of Patent: Jul. 7, 1998

[54] ELECTRIC SCOOTER

[75] Inventor: Steven J. Patmont, Pleasanton, Calif.

[73] Assignee: Patmont Motor Werks, Pleasanton, Calif.

[21] Appl. No.: 593,324

[22] Filed: Jan. 31, 1996

[51] Int. Cl.$^6$ .................................................. B62D 61/00
[52] U.S. Cl. .................... 180/181; 180/220; 180/68.5; 180/65.1; 280/87.041
[58] Field of Search .................................. 180/219, 220, 180/180, 181, 68.5, 65.1; 280/87.041

[56] References Cited

U.S. PATENT DOCUMENTS

| | | | |
|---|---|---|---|
| 4,842,091 | 6/1989 | Badsey | 180/181 |
| 5,647,450 | 7/1997 | Ogawa et al. | 180/220 |

Primary Examiner—Brian L. Johnson
Assistant Examiner—Avraham Lerner
Attorney, Agent, or Firm—Townsend and Townsend and Crew

[57] ABSTRACT

An electric powered scooter having a tubular frame extending between a front steerable wheel and a rear electrically powered wheel. The tubular frame extends below the wheel centers parallel to the surface of the ground between the front and rear wheels. A platform for the standing support of the scooter rider is mounted from frame mounted brackets so as to define between the upper portion of the tubular frame and the lower portion of the platform a spatial interval. Four batteries—with two on each side of the central frame member—are mounted to the underside of the platform which each battery supported by a case enclosing the battery at the bottom and mounting the battery flush to the underside of the platform at the top. An enclosed wiring channel is formed with the tubular frame at the bottom, the batteries on either side, and the bottom of the platform at the top. The scooter design thus has the powering electric batteries mounted in a concealed under body position relative to the platform giving an electric scooter having a low center of gravity with optimal riding profile.

3 Claims, 3 Drawing Sheets

ELECTRIC SCOOTER

This invention relates to scooters. More specifically, an electric scooter is disclosed where the batteries are concealed below the standing platform of the scooter to enable a low cost electrical vehicle having both recreational and industrial applications.

BACKGROUND OF THE INVENTION

Gas powered scooters are known. More particularly, a gas powered motor scooter exemplary of that set forth and claimed in Witthaus U.S. patent application Ser. No. 08/561,613 filed Nov. 21, 1995, now U.S. Pat. No. 5,556,660, published Aug. 26, 1997, entitled SELF STARTING AND BRAKING CLUTCH FOR FLUID COUPLING FOR SMALL ENGINE WITH DIRECT WHEEL DRIVE, assigned to the Assignee herein.

Electric vehicles are well known. However, it has not been suggested how to optimally design an electric powered scooter. Accordingly, this application discloses such an optimum design.

SUMMARY OF THE INVENTION

An electric powered scooter is disclosed, having a chassis with a tubular frame extending between a front steerable wheel and a rear electrically powered wheel. The tubular frame extends below the wheel centers, parallel to the surface of the ground between the front and rear wheels. A platform for the standing support of the scooter rider is mounted from frame mounted brackets so as to define between the upper portion of the tubular frame and the lower portion of the platform a spatial interval. Four batteries— with two on each side of the central frame member—are mounted to the underside of the platform, with each battery supported by a case enclosing the battery at the bottom and mounting the battery flush to the underside of the platform at the top. An enclosed wiring channel is formed with the tubular frame at the bottom, the batteries on either side, and the bottom of the platform at the top. The scooter design thus has the powering electric batteries mounted in a concealed under body position relative to the platform giving an electric scooter having a low center of gravity with optimal riding profile.

DESCRIPTION OF THE PREFERRED EMBODIMENT

Figure 1:
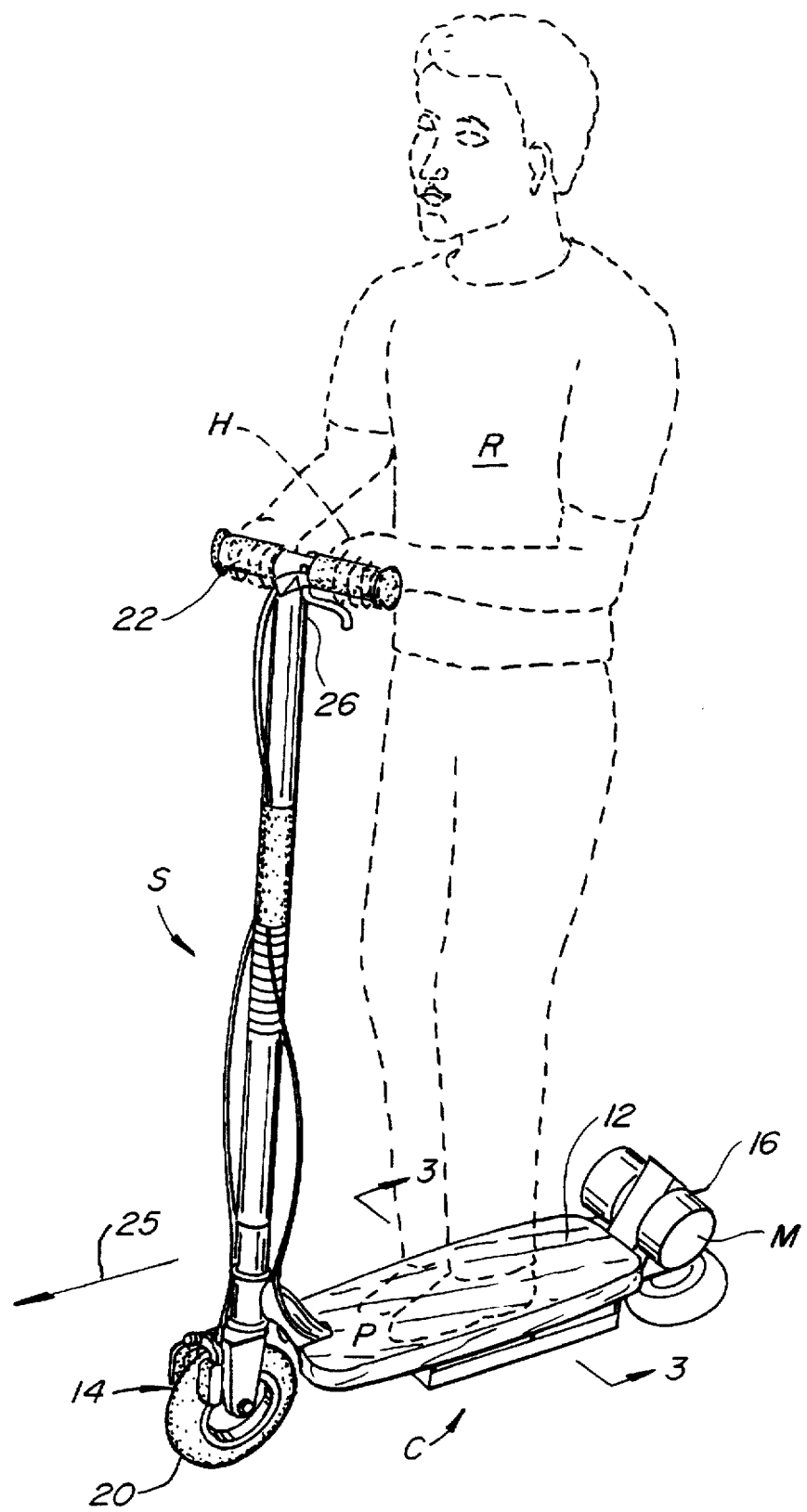
FIG. 1 is a perspective view of a rider on the electric scooter of this invention illustrating the rider standing on the supporting platform with batteries concealed and supported below the platform.

Referring to FIG. 1, electric scooter S is illustrated supporting rider R on upper surface 12 of platform P. Referring to both FIGS. 1 and 2, electric scooter S includes chassis C front wheel mount 14 having front steering wheel 20 steered by steering handle 22. Chassis C includes rear wheel mount 16 with overlying driving motor M in driving engagement with mounted rear wheel 15. Simple switch 26 upon closure by hand H of rider R causes an electrical connection to be made to driving motor M for causing forward motion in the direction of arrow 25.

Figure 2:
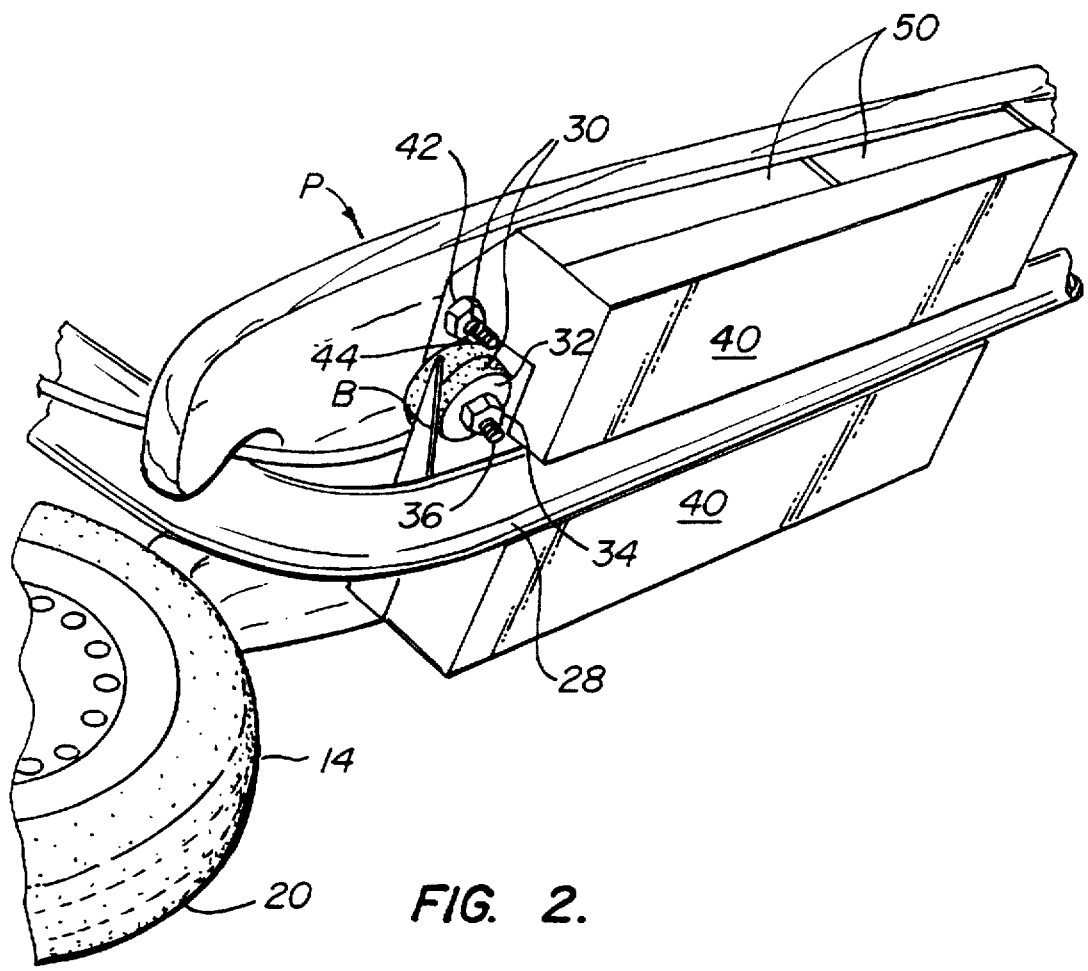
FIG. 2 is a bottom perspective view to the underside of the standing platform of the scooter shown in FIG. 1 illustrating the elevated platform support relative to the central tubular frame member, and the fastening of batteries in protective mounted cases below the platform but above the tubular member for the powering of the electric scooter.

Referring to FIG. 2, chassis C includes singular tubular member 28 extends between front wheel mount 14 and rear wheel mount 16. Support of platform P from singular tubular member 28 is easily understood. Specifically, singular tubular member 28 has bracket B welded thereto. On either side of bracket B there are mounted rubber shock pads 30 with mounting washer 34 holding platform secure bolt 36 to bracket B. Thus platform P is securely held to chassis C overlying singular tubular member 28.

On each side of singular tubular member 28 battery holding brackets 40 are mounted. These battery holding brackets 40 are secured front and rear by platform secure bolts 44 and locking nuts 42. As can be seen, the respective battery holding brackets 40 hold lead gel batteries 50 to the underside of platform P on either side of singular tubular member 28.

Figure 3:
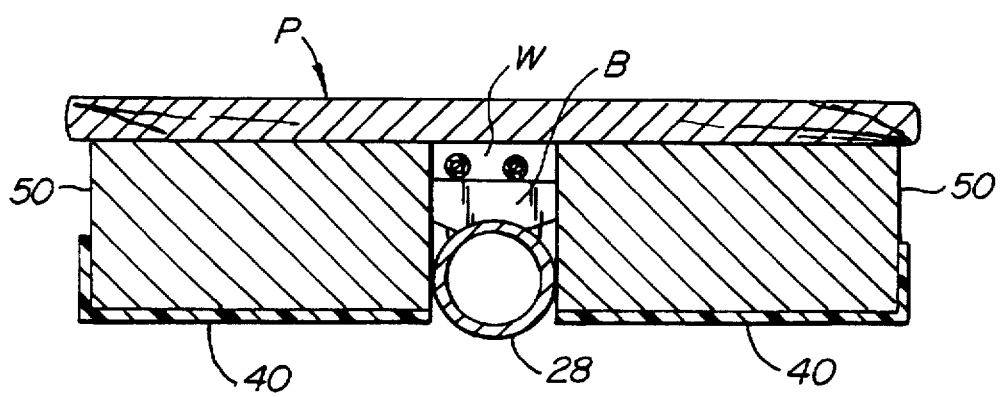
FIG. 3 is a side elevation section taken along lines 3—3 of FIG. 1 illustrating how a wire receiving channel is defined between the bottom of the platform at the top, the top of the central chassis member at the bottom, and the platform supported batteries on either side; and, FIG. 4 is a schematic sketch illustrating the electric powered drive of the rear wheel from a simple on-off switch on the steering handle designating that portion of the wiring that is confined within the channel overlying the tubular frame, underlying the platform, and on either side of the dependingly supported platform mounted batteries.

Referring solely to FIG. 3, it will be seen that the described battery mount provides an advantage in mounting of scooter control electrical wiring W. Specifically, scooter control electrical wiring W passes in a defined channel including lead gel batteries 50 on either side, platform P overhead, and singular tubular member 28 below. Thus, the design provides for a simple single wire channel extending essentially the length of chassis C.

Three additional features are present. First, lead gel batteries 50 are mounted at the lowest possible location. They enable electric scooter S to have the lowest possible center of gravity for maximum stability. Second, lead gel batteries 50 are protected by battery holding brackets 40 in possible contact with the ground over which electric scooter S passes. Finally, it will be observed that singular tubular member 28 forms the lowest point on electric scooter S. This enables electric scooter S to encounter occasional under surface contact without substantial damage to battery holding brackets 40 and their contained lead gel batteries 50.

Figure 4:
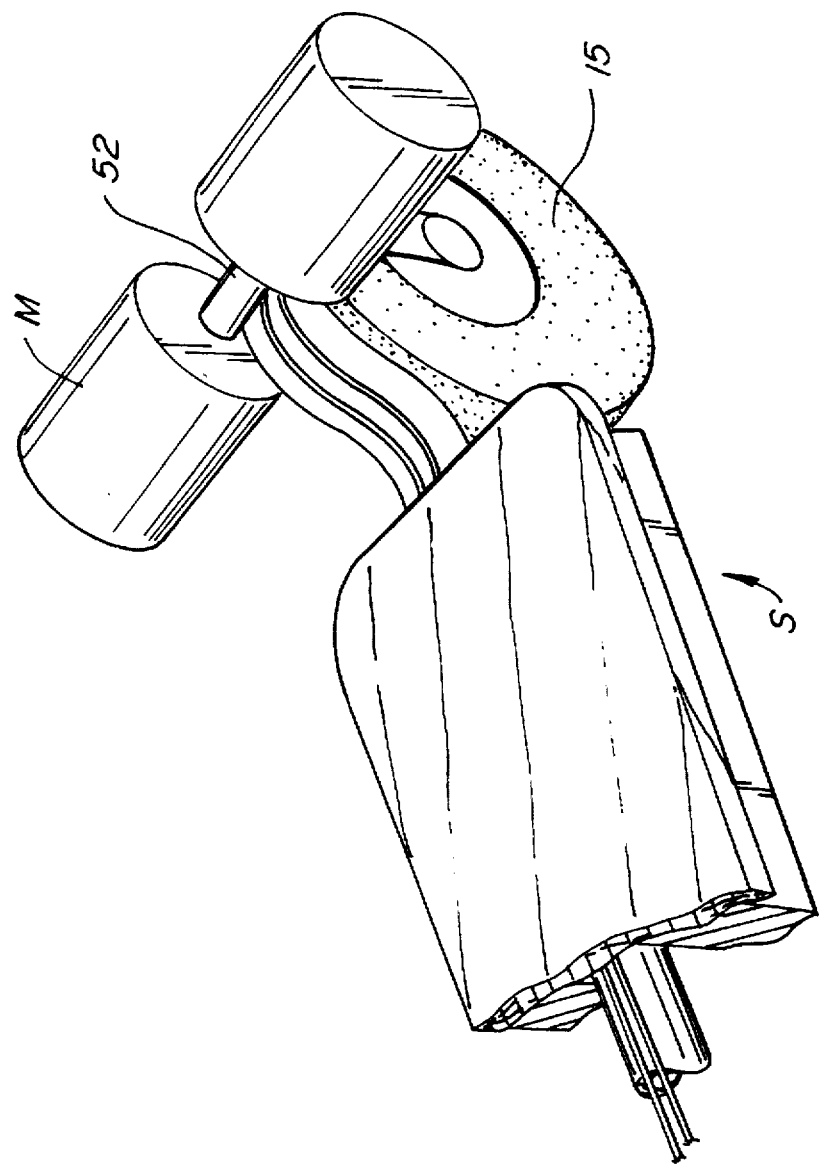
Figure 4:
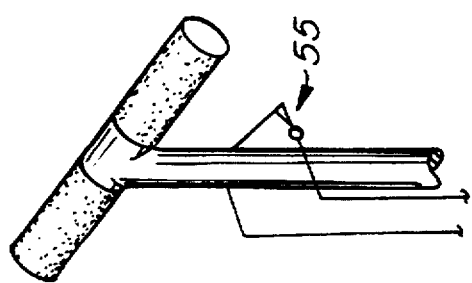

With reference to the schematic of FIG. 4, direct drive of electric scooter S can be simply understood. Driving motor M at shaft 52 directly drives mounted rear wheel 15. Switch 55 on steering handle 22 causes connected batteries to drive driving motor M when closed propelling electric scooter S.

What is claimed is:

1. An electrically powered scooter for powered movement over a ground surface comprising in combination:
    a scooter chassis having a rear wheel mount at one end and a front wheel mount at the other end with a chassis support member extending therebetween;
    a chassis supported front wheel mounted to the front wheel mount for turning steering movement with respect to the front wheel mount;
    the chassis includes a single central tubular member extending between the front wheel mount and the rear wheel mount;
    a chassis supported rear wheel;

a chassis supported motor;

means adjacent the rear wheel mount for enabling the chassis supported motor to drive the chassis supported rear wheel;

a platform supported from the scooter chassis between the rear wheel mount and the front wheel mount defining an upper surface for supporting a scooter rider and an underside exposed to the ground surface over which the scooter passes;

a battery support between the underside of the platform and ground over which the scooter passes for supporting motor driving batteries;

a plurality of batteries mounted to either side of the single central tubular member in depending relations from the platform; and, the batteries mounted to either side of the single central tubular member define a wiring channel therebetween with the platform overhead for enabling scooter operating wiring to pass between scooter controls at the forward portion of the chassis and the chassis supported motor.

2. An electrically powered scooter for powered movement over a ground surface comprising in combination:

a scooter chassis having a rear wheel mount axis at one end and a front wheel mount axis at another end with a chassis support member extending therebetween;

a chassis supported front wheel mounted to the front wheel mount axis for turning steering movement with respect to the chassis;

a chassis supported rear wheel mounted to and turning on the rear wheel mount axis;

a single tubular member forming a sole structural chassis connecting member between the front wheel mount axis and the rear wheel mount axis, the single tubular member extending below the front wheel mount axis and the rear wheel mount axis;

a chassis supported motor;

means adjacent the rear wheel mount axis for enabling a chassis supported motor to drive the scooter chassis supported rear wheel;

a platform supported on the single tubular member of the scooter chassis between the rear wheel mount axis and the front wheel mount axis defining an upper surface for supporting a scooter rider and an underside exposed to the ground surface over which the electrically powered scooter passes; and, a battery support between the underside of the platform and ground over which the electric powered scooter passes for supporting motor driving batteries; and, batteries supported on either side of the single tubular member.

3. An electrically powered scooter according to claim 2 and wherein:

the single tubular member is lower than the batteries supported on either side of the single tubular member.

\* \* \* \* \*